United States Patent [19]
Suzuki et al.

[11] Patent Number: 5,729,299
[45] Date of Patent: Mar. 17, 1998

[54] KNEE CORRECTION

[75] Inventors: Fuminori Suzuki; Hiroshi Kitagawa, both of Tokyo, Japan

[73] Assignee: U.S. Philips Corporation, New York, N.Y.

[21] Appl. No.: 422,372

[22] Filed: Apr. 14, 1995

[30] Foreign Application Priority Data

Apr. 18, 1994 [JP] Japan .................. 6-103313

[51] Int. Cl.$^6$ .................................. H04N 9/64
[52] U.S. Cl. .................. 348/649; 348/645; 348/679; 348/256
[58] Field of Search .................. 348/649–654, 348/647, 648, 655, 656, 673–680, 675, 224, 225, 229, 234, 242, 254–256, 645, 646; H04N 9/68, 9/64

[56] References Cited

U.S. PATENT DOCUMENTS

| 3,950,779 | 4/1976 | Suenaga | 348/652 |
| 4,499,486 | 2/1985 | Favreau et al. | 348/649 |
| 4,639,299 | 1/1987 | Tanaka | 348/649 |
| 4,679,072 | 7/1987 | Takayama | 348/649 |
| 4,712,132 | 12/1987 | Soca | 348/679 |

*Primary Examiner*—Michael H. Lee
*Attorney, Agent, or Firm*—Leroy Eason

[57] ABSTRACT

A knee circuit in which the hue on the output side does not differ from the hue on the input side. The knee circuit includes a virtual luminance signal generator for generating a virtual luminance signal Y based on at least one input color signal Rin, Gin and Bin, a virtual correction value generator for monitoring whether the virtual luminance signal Y is equal to or greater than a knee point NP and for generating a virtual correction value Yk by performing a knee correction with respect to the virtual luminance signal Y when it is equal to or greater than the knee point NP. A proportional value generator generates a proportional value Kk showing a ratio of the virtual correction value Yk to the virtual luminance signal Y by dividing the virtual correction value Yk by the virtual luminance signal Y. A correction color signal generator multiplies each of the input color signals Rin, Gin and Bin by the proportional value and outputs a multiplication result as corrected color signals Rout, Gout and Bout, that is, color signals on which knee correction has been performed.

17 Claims, 7 Drawing Sheets

KNEE CORRECTION

BACKGROUND OF THE INVENTION

1. Field of the Invention

This invention relates to a method of and circuit for performing knee correction of color signals.

2. Description of the Related Art

A video camera is required to have a function of vividly and simultaneously photographing bright objects such as a light source and dark objects such as shadows. To satisfy this requirement, a knee circuit is mounted in a video camera for performing correction (knee correction) for lowering the level of an output signal of a CCD (charge-coupled device) when it exceeds a predetermined threshold (knee point. Three knee circuits are mounted in a triple-plate type video camera in which three CCDs are mounted. As a result, knee correction is performed on a red color signal R, a green color signal G and a blue color signal B. Here, an explanation will be given with the assumption that knee correction is independently performed on each of the color signals.

The same threshold is set for each knee circuit to specify a level (knee point NP) of an input signal for starting the knee correction. Each knee circuit starts knee correction when the level of an input signal reaches the knee point NP.

An explanation will be given of the operation of a conventional knee circuit with reference to FIG. 8.

FIG. 8 illustrates waveform diagrams showing color signals that are outputted from the conventional knee circuit. In FIG. 8, the axis of ordinates (vertical axis) shows a level of a color signal that is outputted from the knee circuit, and the axis of abscissa (horizontal axis) shows a level of exposure (luminance) of an object. The levels of the red corrected color signal Rout, the green corrected color signal Gout and the blue corrected color signal Bout as illustrated in the drawing designate a case where the input is an image of a reddish object, for example, an object having "skin color" is photographed, in which the red color signal Rin has a level higher than those of the green color signal Gin and the blue color signal Bin.

When the luminance of the object is enhanced, firstly, only the color signal Rin (Rout) reaches the knee point NP. As a result, only knee correction with respect to the color signal Rin is started (luminance $I_1$). Thereafter, the color signals Gin and Bin successively reach the knee point NP and the correction color signals Gout and Bout on which knee correction has been performed are outputted (luminance $I_2$, $I_3$).

When the luminance is from $I_1$, through $I_2$, knee correction is performed only on the color signal Rin and when the luminance is from $I_2$ to $I_3$, knee correction is performed on each of the color signals Rin and Gin. Further, when the luminance is equal to or more than $I_3$, knee correction is performed on all of the color signals Rin, Gin and Bin. That is, the corrected color signals Rout, Gout and Bout on which knee correction is performed are outputted.

As explained above, in the conventional knee circuit, there is a situation in which knee correction is performed on only one or two color signals. When knee correction is performed on only one or two color signals, a correlation of (R-G):(B-G) among the corrected color signals that are outputted from the knee circuit differs from that of the color signals applied to the knee circuit. The change of correlation signifies that hues differ between the input side and the output side of the knee circuit. Accordingly, there is a problem in the conventional knee circuit in which the hue on the input side differs from the hue on the output side after knee correction is performed.

SUMMARY OF THE INVENTION

This invention has been arrived at in view of the above problem and it is an object thereof to provide a knee correction in which the hue on the input side does not differ from that on the output side.

According to a first aspect of the present invention, there is provided a knee circuit comprising a virtual luminance signal generating means for generating a virtual luminance signal Y on the basis of one or at least two signals selected from a group of input signals including a red color signal Rin, a green color signal Gin and a blue color signal Bin, a virtual correction value generating means for generating a virtual correction value Yk by performing knee correction with respect to the virtual luminance signal Y when a level of the virtual luminance signal Y is equal to or more than a knee point NP at which the knee correction is to be started, a proportional value generating means for generating a proportional value Kk indicating a ratio of the virtual correction value YK to the virtual luminance signal Y, and a corrected color signal generating means for generating corrected color signals Rout, Gout and Bout by multiplying of each of the color signals Rin, Gin and Bin by the proportional value Kk when the level of the virtual luminance signal Y is equal to or greater more than the knee point NP.

According to a second aspect of the present invention, the knee circuit according to the first aspect further comprising a high luminance color suppressing circuit, said high luminance suppressing circuit having a coefficient generating means for generating a first coefficient $K_1$ defined as $$(Gdet-Gin)/(Gdet-Gth),$$

a second coefficient $K_2$ defined as $$(Rmax-Yk)/(Rout-Yk),$$

and a third coefficient $K_3$ defined as $$(Bmax-Yk)/(Bout-Yk),$$

on the basis of a saturation detection level Gdet specifying a level of the corrected color signal Gout at which color cannot be reproduced, a virtual detection level Gth which is set to a level that is less than the saturation detection level Gdet and more than the knee point NP, a red color maximum output level Rmax specifying a maximum level of red color at which output of the red color is allowable, and a blue color maximum output level Bmax specifying a maximum level of blue color at which output of the blue color is allowable, and a correction color signal forming means for generating an output red color signal (Rend) defined as $$Yk+(Rout-Yk)\cdot K_0,$$

an output green color signal Gend defined as $$Yk+(Gout-Yk)\cdot K_0,$$

and an output blue color signal Bend defined as
$Yk+(Bout-Yk)\cdot K_0$ where $K_0 \leq 1$ and where $K_0$ is a minimum coefficient selected from the group of respective coefficients of $K_1$, $K_2$ and $K_3$, when the level of the green color signal Gin is equal to or more than the virtual detection level Gth, or when the level of the corrected color signal Rout is equal to or more than the red color maximum output level Rmax, or when the level of the corrected color signal Bout is equal to or more than the blue color maximum output level Bmax.

According to a third aspect of the present invention, in knee circuit according to the first or the second aspect, the virtual luminance signal generating means generates a virtual luminance signal Y defined as $$0.6 \cdot Gin + 0.3 \cdot Rin + 0.1 \cdot Bin.$$

According to a fourth aspect of the present invention, there is provided the knee circuit according to the first or the second aspect, wherein the virtual luminance signal generating means generates a virtual luminance signal Y defined as $$0.625 \cdot Gin + 0.25 \cdot Rin + 0.125 \cdot Bin.$$

According to a fifth aspect of the present invention, there is provided the knee circuit according to the first or the second aspect, wherein the virtual luminance signal generating means generates a virtual luminance signal Y defined as $$0.5 \cdot Gin + 0.5 \cdot Rin.$$

According to a sixth aspect of the present invention, in the knee circuit according to the first or the second aspect, the virtual luminance signal generating means outputs a color signal having a maximum level selected from a group consisting of the respective color signals Rin, Gin and Bin as the virtual luminance signal Y.

The knee circuit of the present invention generates the virtual luminance signal Y in the virtual luminance signal generating means based on one or at least two signals selected from the group including of the red color signal Rin, the green color signal Gin and the blue color signal Bin which are inputted to the knee circuit. The virtual correction value generating means monitors whether the virtual luminance signal Y is equal to or more than the knee point NP, and generates the virtual correction value Yk by performing knee correction on the virtual luminance signal Y when it is equal to or greater than the knee point NP. The proportional value generating means divides the virtual correction value Yk by the virtual luminance signal Y and generates the proportional value Kk showing a ratio of the virtual correction value Yk to the virtual luminance signal Y. The corrected color signal generating means performs a multiplication of each of the input color signals by the proportional value Kk, and outputs the result as the corrected color signals Rout, Gout and Bout,i.e. color signals on which knee correction has been performed.

The knee circuit of the present invention outputs any color signals equal to those on the input side, that is, color signals on which no knee correction has been performed, or color signals all of which have been subjected to knee correction. Accordingly, there is no situation in which knee correction is performed on only one or two color signals. Accordingly, hues on the output side of the knee circuit are substantially equal to those on the input side.

DESCRIPTION OF THE PREFERRED EMBODIMENT

Figure 1:
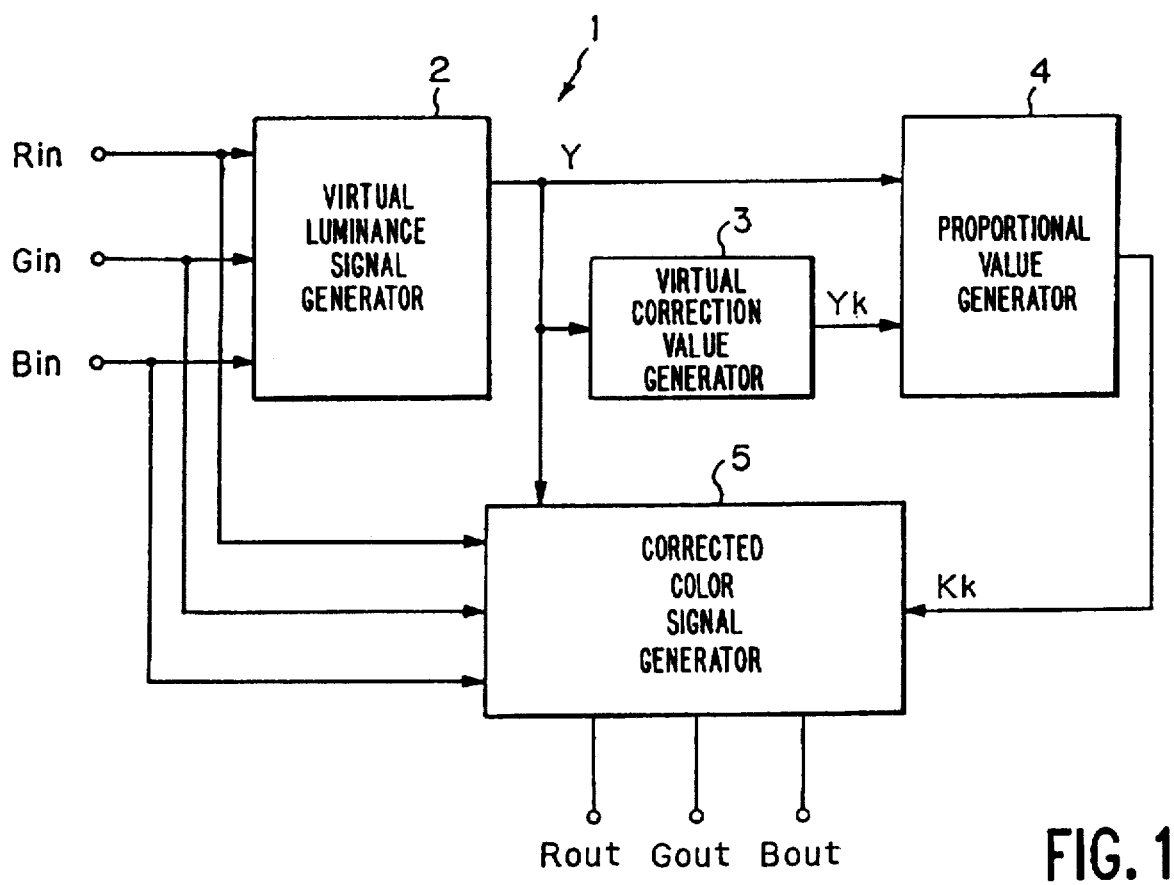
FIG. 1 is a block diagram of a knee circuit of the present invention.

Explanation of the Reference Numerals 1 knee circuit 2 virtual luminance signal generating means 3 virtual correction value generating means 4 proportional value generating means 5 corrected color signal generating means 6 coefficient generating means 7 output color signal generating means FIG. 1 is a block diagram of a knee circuit of the present invention.

The illustrated knee circuit 1 comprises a microprocessor and digital circuits such as logic elements. Three primary color signals which have been converted from analog to digital, that is, the red color signal Rin, the green color signal Gin and the blue color signal Bin, are inputted to a virtual luminance signal generating means 2. The virtual luminance signal generating means 2 generates a virtual luminance signal Y defined by the following equation (1) based on the input Rin, Gin and Bin color signals.

$$Y = 0.6 \cdot Gin + 0.3 \cdot Rin + 0.1 \cdot Bin \quad (1)$$

The virtual luminance signal Y generated by the virtual luminance signal generating means 2 is inputted to a virtual correction value generating means 3. The virtual correction value generating means 3 generates a virtual correction value Yk by performing knee correction with respect to the virtual luminance signal Y when the level of the virtual luminance signal Y is equal to or more than the knee point NP. Further, when the level of the virtual luminance signal Y is less than the knee point NP, a virtual correction value Yk that is equal to the virtual luminance signal Y is generated.

The virtual correction value Yk which has been generated by the virtual correction value generating means 3 is inputted to a proportional value generating means 4. The proportional value generating means 4 generates a proportional value Kk by dividing the virtual correction value Yk by the virtual luminance signal Y, separately input to the proportional value generating means 4.

The proportional value Kk which has been generated by the proportional value generating means 4 is inputted to a correction color signal generating means 5. The corrected color signal generating means 5 generates a red correction color signal Rout, a green corrected color signal Gout and a blue corrected color signal Bout defined by the following equations (2), (3) and (4), based on the proportional value Kk and the color signals Rin, Gin and Bin that are separately inputted to the correction signal generating means 5.

$$Rout = Rin \cdot Kk \quad (2)$$

$$Gout = Gin \cdot Kk \quad (3)$$

$$Bout = Bin \cdot Kk \quad (4)$$

Accordingly, the knee circuit 1 of the present invention performs knee correction simultaneously on all of the color signals Rin, Gin and Bin and outputs the corrected color signals Rout, Gout and Bout.

An explanation will be given of the operation of the knee circuit 1 of the present invention with reference to FIG. 2 and FIG. 3.

Figure 2:
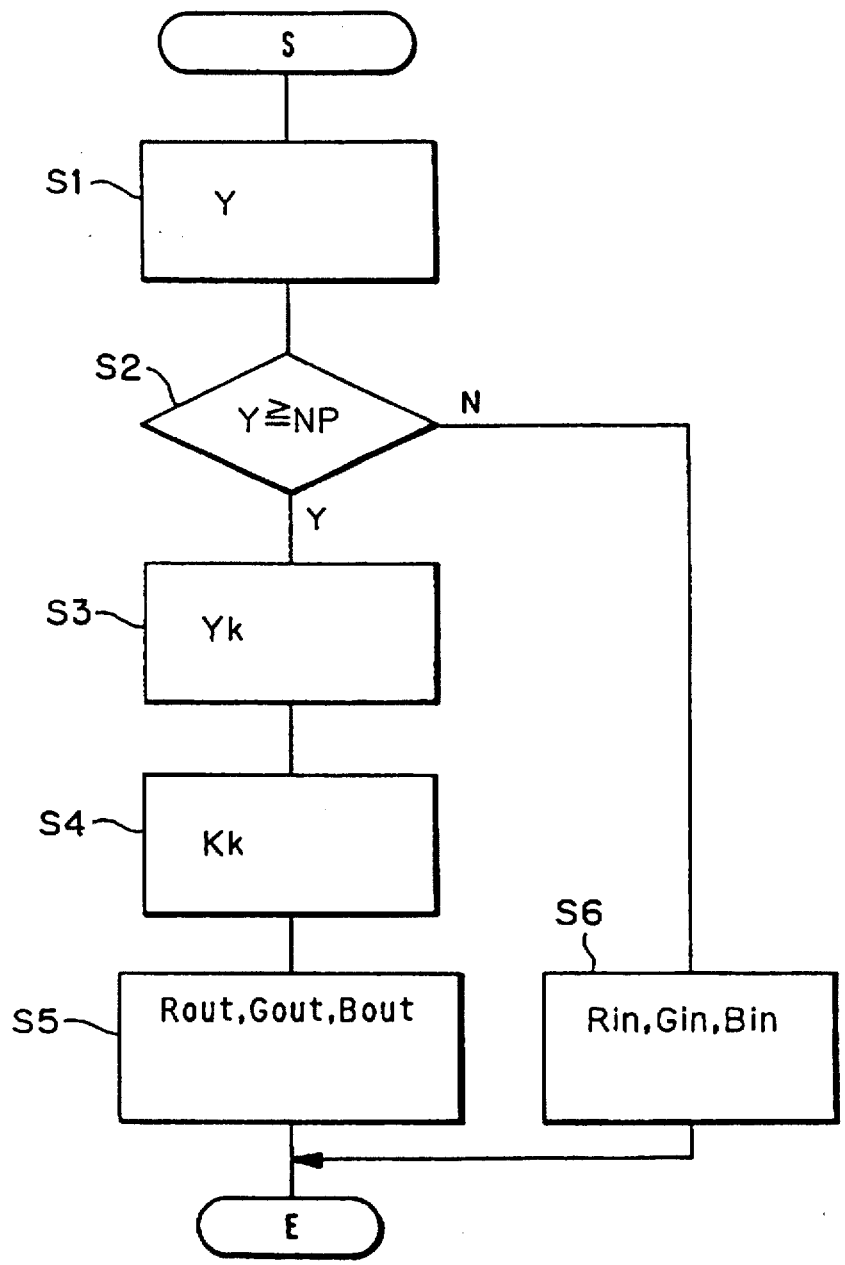
FIG. 2 is a flowchart showing the operation of the knee circuit of the present invention.
Figure 3:
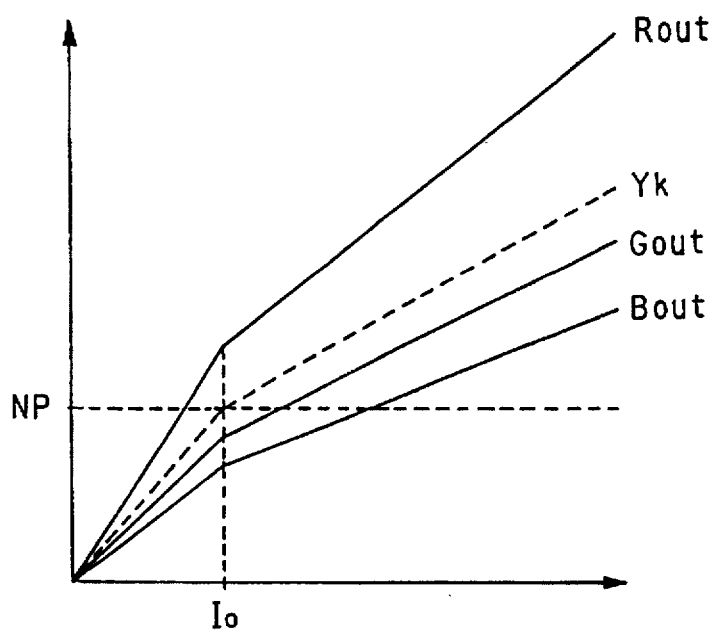
FIG. 3 illustrates first waveform diagrams of output color signals from the knee circuit of the present invention.
Figure 8:
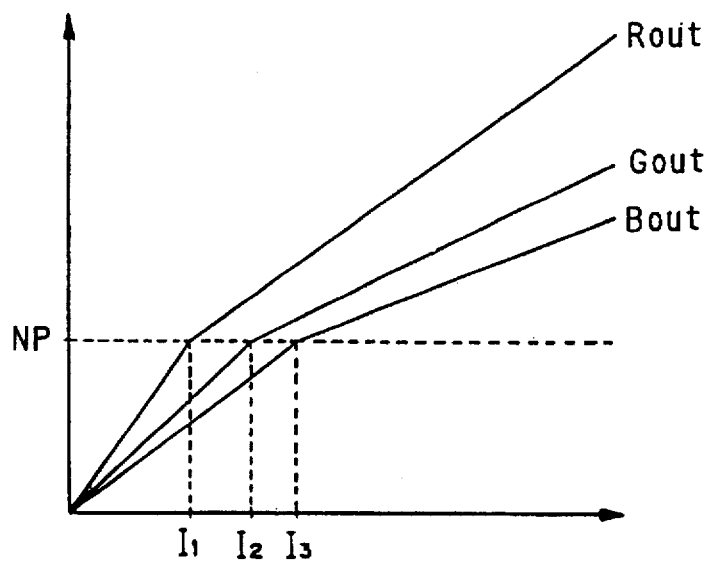
FIG. 8 illustrates waveform diagrams of output color signals from a conventional knee circuit.

FIG. 2 is a flowchart showing the operation of the knee circuit 1 of the present invention, S indicating the start and E indicating the end. FIG. 3 illustrates waveform diagrams of color signals outputted from the knee circuit of the present invention. FIG. 3 illustrates waveform diagrams when signals the same as the three primary color signals shown in FIG. 8 are inputted to the knee circuit 1. The axis of ordinates (vertical axis) designates the level of a color signal that is outputted from the knee circuit and the axis of abscissa (horizontal axis) designates exposure (luminance).

When the color signals Pin, Gin and Bin are inputted to the knee circuit 1, the virtual luminance signal generating means 2 generates the virtual luminance signal Y (FIG. 2: step S1). The generating of the virtual luminance signal Y is carried out successively or during a predetermined period.

The virtual correction value generating means 3 determines whether the level of the input virtual luminance signal Y is equal to or more than the predetermined knee point NP (step S2), and generates the virtual correction value Yk by performing knee correction on the virtual luminance signal Y (step S3), when the level is equal to or more than the knee point NP (Yes).

The proportional value generating means 4 generates the proportional value Kk by dividing the input virtual correction value Yk by the virtual luminance signal Y (step S4).

The corrected color signal generating means 5 multiplies each of the input color signals Pin, Gin and Bin corrected color signals Rout, Gout and generating corrected color signals Rout, Gout and Bout (step S5). When step S5 is performed (when the luminance is equal to or more than a luminance I0: FIG. 3), the color signals on which knee correction has been performed, that is, the corrected color signals Rout, Gout and Bout, are outputted from the knee circuit.

As explained above, knee correction of the color signals Pin, Gin and Bin is achieved by performing the processings of steps S1 through S5 in the knee circuit 1.

Further, when the level of the virtual luminance signal Y is less than the knee point NP in step S2 (No), the virtual correction value generating means 3 outputs, for example, the virtual correction value Yk, equal to the virtual luminance signal Y. As a result, the proportional value generating means 4 outputs the proportional value Kk, the value of which is "1". In this case, the corrected color signal generating means 5 outputs the corrected color signals Rout, Gout and Bout, which are equal to the color signals Pin, Gin and Bin, respectively, (step S6). Accordingly, when step S6 is performed (when the luminance is less than $I_0$ : FIG. 3), the knee circuit outputs the corrected color signals Rout, Gout and Bout, which are equal to the color signals Pin, Gin and Bin, respectively.

Next, an explanation will be given of a knee circuit of the present invention having a high luminance color suppressing circuit with reference to FIG. 4 through FIG. 7. When an image of an object having high luminance is taken, the level (luminance) of the color signal is excessively high. When the level of the color signal is excessively high, so-called color signal saturation occurs. Color signal saturation means a state in which the color of an object cannot be reproduced. Generally, a video camera is mounted with a high luminance color suppressing circuit. When a color signal is generated that corresponds to an object having high luminance the color of which cannot be reproduced, the high luminance color suppressing circuit forcibly sets the color signal to, for example, white color.

The level of a color saturation signal depends on each color signal, with the saturation level of the green color signal G generally being the lowest. Further, saturation levels increase from the red color signal R to the blue color signal B. The high luminance color suppressing circuit starts suppressing color signals when the green color signal Gin reaches its saturation level (saturation detection level Gdet), or when each of the corrected color signals Rout and Bout reaches each of maximum output levels Rmax and Bmax (for example, a maximum level (100%) of a video signal) at which output is allowable. Specifically, the high luminance color suppressing circuit performs setting (suppressing) which makes these signals approach values indicating white with increases in the input level.

Figure 4:
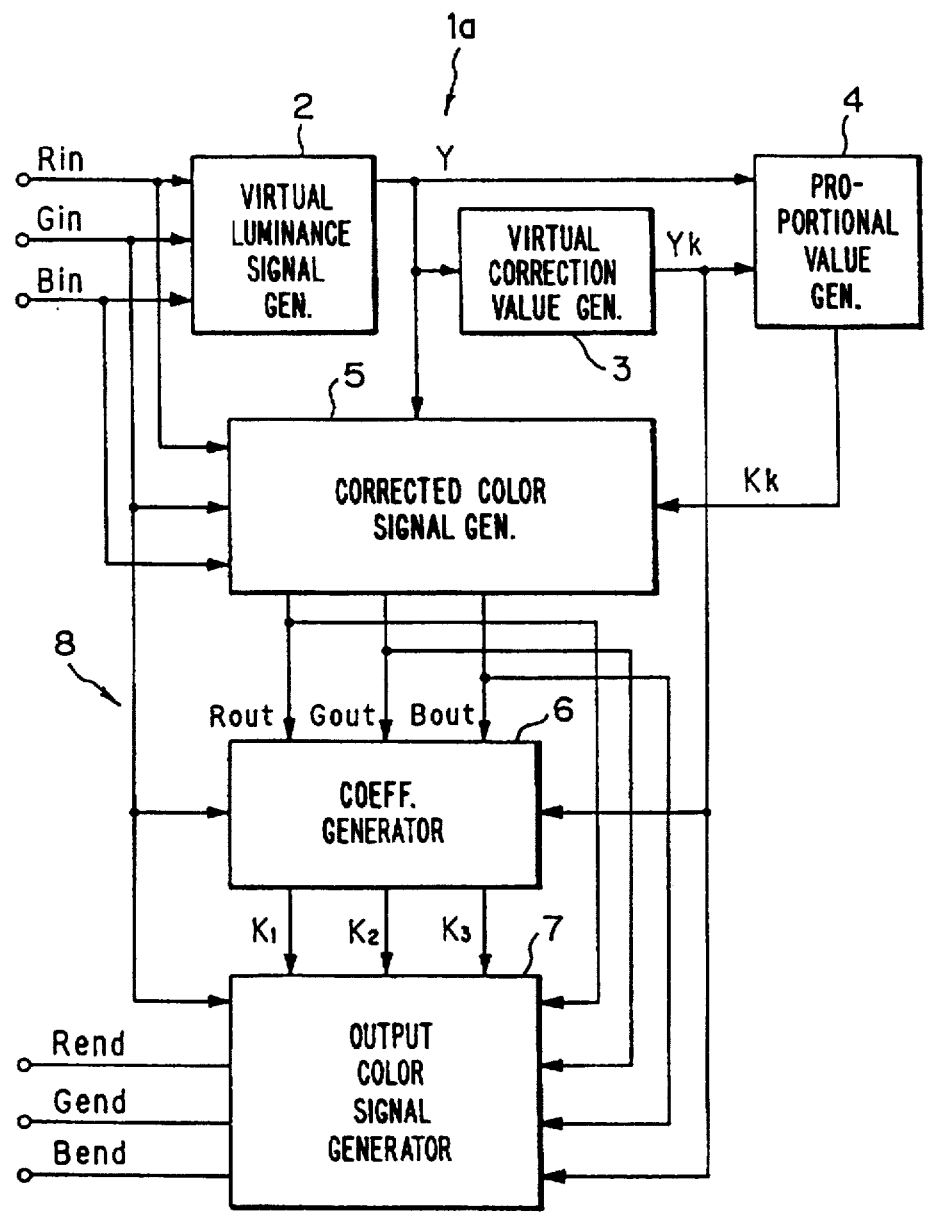
FIG. 4 is a second block diagram relating to a knee circuit of the present invention.

FIG. 4 is a second block diagram relating to a knee circuit of the present invention.

In FIG. 4, devices which are the same as those in FIG. 1 have the same reference numerals allocated thereto, and explanation thereof will be omitted.

A knee circuit 1a shown in FIG. 4 is provided with a high luminance color suppressing circuit 8 comprising a coefficient generating means 6 and an output color signal generating means 7. The high luminance color suppressing circuit 8 is constituted by a part of a digital circuit of a microprocessor or such as a gate circuit which constitutes the knee circuit 1a.

The coefficient generating means 6 generates a first coefficient $K_1$ established by, for example, the following equation (5) based on the saturation detection level Gdet, a virtual detection level Gth and the green color signal Gin, and a second coefficient $K_2$ established by, for example, the following equation (6) and a third coefficient $K_3$ established by, for example, the following equation (7), based on the virtual correction value Yk, the corrected color signal Rout, the red color maximum output level Rmax, the corrected color signal Bout, and the blue color maximum output level Bmax.

$$K_1 = (Gdet - Gin)/(Gdet - Gth) \quad (5)$$

$$K_2 = (Rmax - Yk)/(Rout - Yk) \quad (6)$$

$$K_3 = (Bmax - Yk)/(Bout - Yk) \quad (7)$$

Further, the saturation detection level Gdet is a threshold specifying a level at which the green color signal Gin is saturated. The virtual saturation level Gth is set to a desired value which is less than the saturation detection level Gdet and more than the knee point NP. Each of the maximum output levels Rmax and Bmax is a value specifying each of the corrected color signals Rout and Bout which are at maximum among the color signals outputted from the knee circuit 1.

The virtual correction value Yk which has been generated by the virtual correction value generating means 3, the first coefficient $K_1$, the second coefficient $K_2$ and the third coefficient $K_3$ which have been generated by the coefficient generating means 6, and the corrected color signals Rout, Gout and Bout which have been generated by the corrected color signal generating means 5 are inputted to the output color signal generating means 7. The output color signal generating means 7 selects a minimum coefficient $K_0$ from the input first through third coefficients $K_1$ through $K_3$. Thereafter, the output color signal generating means 7 generates output color signals, that is, a red output color signal Rend established by the following equation (8), a green output color signal Gend established by the following equation (9) and a green output color signal Bend established by the following equation (10) based on the virtual correction value YK and the coefficient $K_0$.

$$Rend = Yk + (Rout - Yk) \cdot K0 \quad (8)$$

$$Gend = Yk + (Gout - Yk) \cdot K0 \quad (9)$$

$$Bend = Yk + (Bout - Yk) \cdot K0 \quad (10)$$

Figure 5:
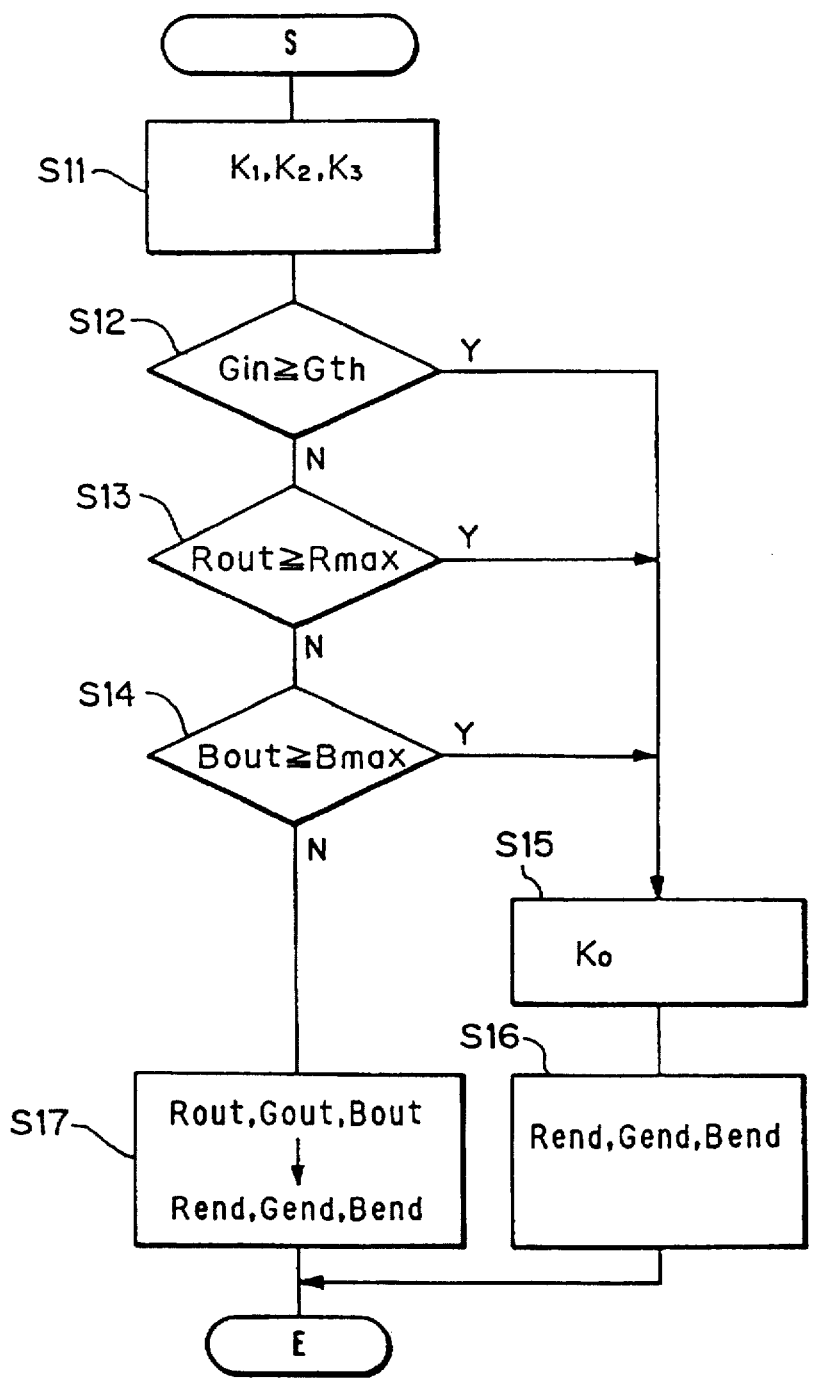
FIG. 5 is a flowchart showing the operation of the knee circuit.
Figure 6:
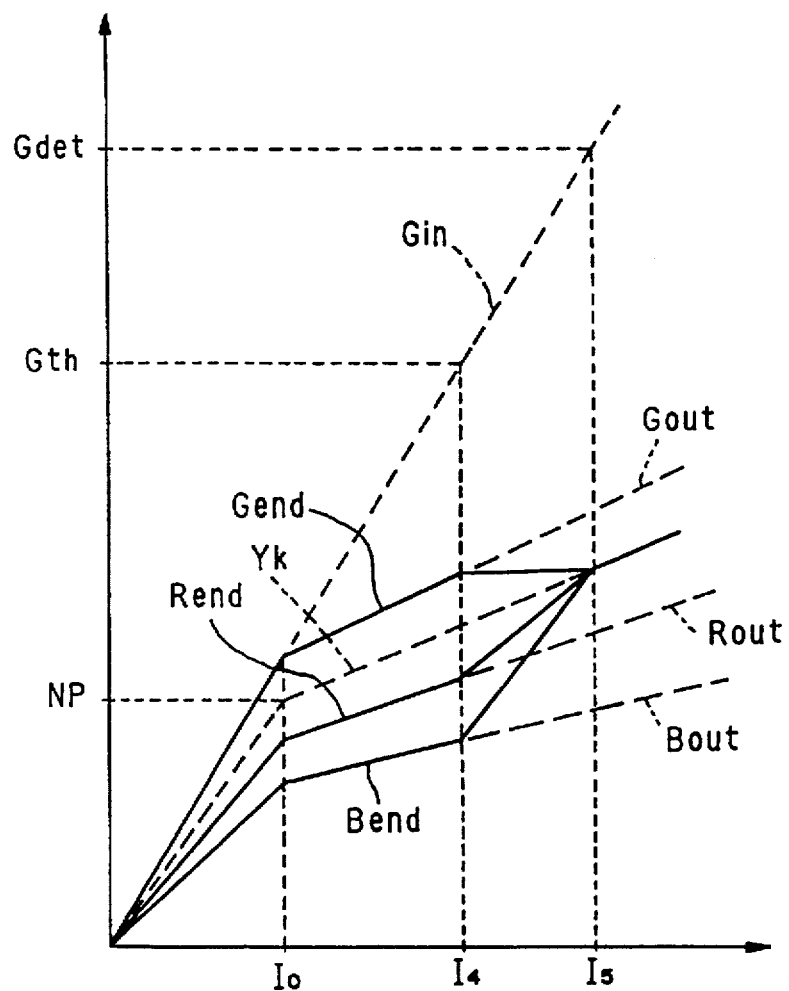
FIG. 6 illustrates second waveform diagram of output color signals from a knee circuit of the present invention.
Figure 7:
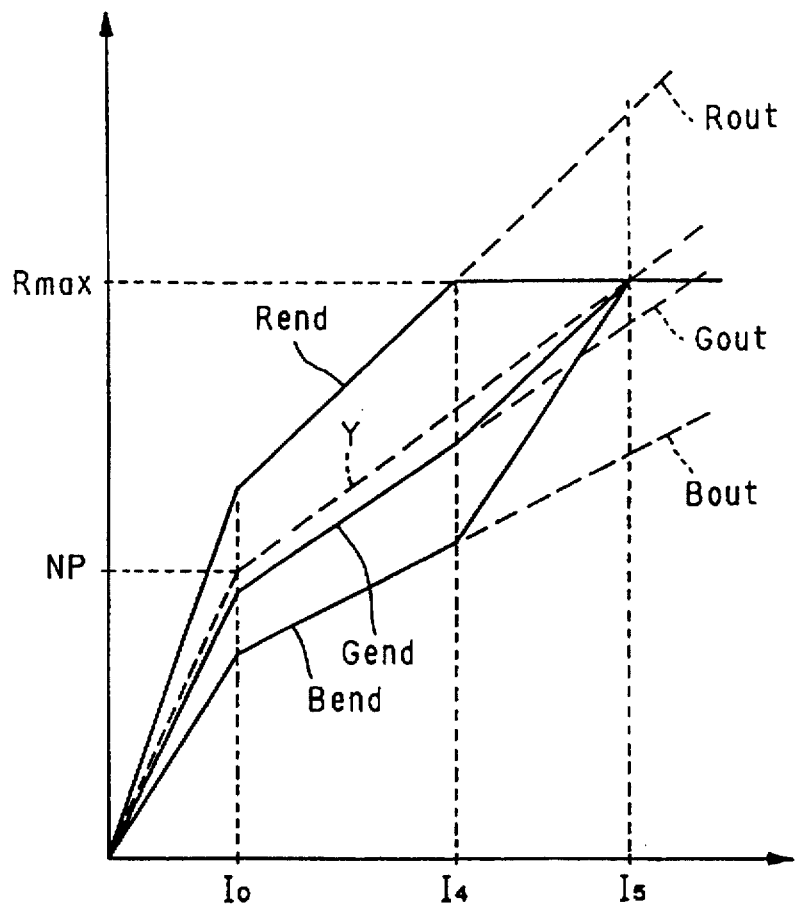
FIG. 7 illustrates third waveform diagrams of output color signals from the knee circuit of the present invention.

An explanation will be given of the operation of the high luminance color suppressing circuit of the present invention with reference to FIG. 5 through FIG. 7. FIG. 5 is a second flowchart showing the operation of the knee circuit of the present invention (S is start, and E is end). FIG. 6 illustrates second waveform diagrams showing the operation of the knee circuit of the present invention, and FIG. 7 illustrates third waveform diagrams showing the operation of the knee circuit of the present invention. In FIG. 6 and FIG. 7, the axis of ordinates (vertical axis) designates the level of the output color signal which is outputted from the high luminance color suppressing circuit 8, and the axis of abscissa (horizontal axis) designates the level of exposure (luminance).

Further, since the elements of FIG. 4 other than the high luminance color suppressing circuit 8 perform the same operations as those in the case which has previously been explained with reference to FIG. 2 and FIG. 3, the explanation of FIG. 4 will be given mainly with regard to the operation of the high luminance color suppressing circuit 8.

When the coefficient generating means 6 generates the first through third coefficients $K_1$, $K_2$ and $K_3$ (step S11), the output color signal generating means 7 determines whether the color signal Gin is equal to or greater than the virtual detection level Gth (step S12). If the result of this determination is no, the output color signal generating means 7 determines whether the corrected signal Rout is equal to or greater than the maximum output level Rmax (step S13). If the result of this determination is no, the output color signal generating means 7 further determines whether the corrected signal Bout is equal to or greater than the maximum output level Bmax. (step S14).

When the color signal Gin has a value that is equal to or greater than the virtual detection level Gth, the result of the determination in step S12 is yes as shown in FIG. 6. In receiving the result of the determination, the output color signal generating means 7 selects the minimum coefficient $K_0$ from the first through third coefficients $K_1$ through $K_3$ (step S15). Further, the output color signal generating means 7 generates the output color signals Rend, Gend and Bend based on the corrected color signals Rout, Gout and Bout, the virtual correction value Yk and the coefficient $K_0$ (step S16). When step S16 is performed (when the luminance is equal to or more than a luminance $L_4$ and less than a luminance $L_5$: FIG. 6), the output color signals Rend, Gend and Bend, in which the correlation among the color signals Rout, Gout and Bout is maintained, are outputted from the output color signal generating means 7 (high luminance color suppressing circuit 8).

When the color signal Rout is equal to or greater than the maximum output level Rmax as shown in FIG. 7, the result of the determination in step S13 is yes. By receiving the result of the determination, the output color signal generating means 7 generates the output color signals Rend, Gend and Bend.

Similarly, when the result of the determination in step S14 is yes, steps S15 and S16 are performed, and the output color signals Rend, Gend and Bend are generated. Further, the output color signal generating means 7 can forcibly set the value of the output color signal Rend to the maximum output level Rmax when the result of step S13 is yes and the value of the output color signal Bend to the maximum output level Bmax when the result of step S14 is yes.

When the result of step S14 is no, processing of the high luminance color suppression is not performed. That is, the output color signal generating means 7 outputs the corrected color signals Rout, Gout and Bout as the output color signals Rend, Gend and Bend.

As explained above, when steps S11 through S17 are performed in the high luminance color suppressing circuit 8 (knee circuit 1a), the output red color signal Rend, the output green color signal Gend and the output blue color signal Bend, wherein high luminance color suppression processing has been performed, are provided while maintaining the correlation among the color signals Rin, Gin and Bin.

The present invention is not restricted to the above embodiments.

The virtual luminance signal generating means 2 may form a virtual luminance signal Y defined as the following equation (11) or (12) as well as the equation (1).

$$Y = 0.625 \cdot Gin + 0.25 \cdot Rin + 0.125 \cdot Bin \quad (11)$$

$$Y = 0.5 \cdot Gin + 0.5 \cdot Rin \quad (12)$$

The virtual luminance signal generating means 2 may compare the levels of the color signals Rin, Gin and Bin in generating the virtual luminance signal Y and use a color signal having a maximum level as the virtual luminance signal Y.

The corrected color signal generating means 5 may achieve the determination of outputting the color signals Rin, Gin and Bin as the corrected color signals Rout, Gout and Bout by monitoring the level of the virtual luminance signal Y similar to the virtual correction value generating means 3, or by separately receiving the information that the virtual luminance signal Y does not exceed the level of the knee point NP from the virtual correction value generating means 3.

With respect to the coefficient generating means 6, this may be removed from the high luminance color suppressing circuit 8 when the coefficient $K_0$ is set to "1", that is, when the correlation among the saturation detection level Gdet and the respective color signals need not be considered.

According to the knee circuit of the present invention, knee correction is performed simultaneously with respect to all of the color signals Rin, Gin and Bin, and therefore provides color signals after knee correction by which the hue on the output side does not differ from the hue on the input side. Further, a state is avoided in which high luminance color suppression needs to be performed on a particular color signal or signals (one or two of the corrected color signals Rout, Gout and Bout), thereby providing color signals after suppression in which the hue on the output side does not differ from that on the input side.

We claim:

1. A knee circuit comprising:
    a virtual luminance signal generating means for generating a virtual luminance signal Y on the basis of two signals selected from a group of input signals including a red color signal Rin, a green color signal Gin and a blue color signal Bin;

a virtual correction value generating means for generating a virtual correction value Yk by performing a knee correction with respect to the virtual luminance signal Y when a level of the virtual luminance signal Y is equal to or greater than a knee point NP at which the knee correction is to be started;

a proportional value generating means for generating a proportional value Kk indicating a ratio of the virtual correction value Yk to the virtual luminance signal Y; and a corrected color signal generating means for generating corrected color signals Rout, Gout and Bout by multiplying each of the input color signals Rin, Gin and Bin by the proportional value Kk when the level of the virtual luminance signal Y is equal to or greater than the knee point NP.

2. The knee circuit as claimed in claim 1 wherein the virtual luminance signal generating means generates the virtual luminance signal Y defined as $$0.5 \cdot Gin + 0.5 \cdot Rin.$$

3. The knee correction circuit as claimed in claim 1 further comprising a high luminance suppressing circuit, said high luminance suppressing circuit comprising:

coefficient generating means responsive to said corrected color signals (Rout, Gout, Bout), said input green color signal (Gin) and said virtual correction value (Yk) for generating first, second and third coefficients K1, K2 and K3, respectively, and an output correction color signal generating means controlled by said first, second and third coefficients K1, K2 and K3, respectively, said input green color input signal, said corrected color signals (Rout, Gout, Bout) and said virtual correction value (Yk) for generating red, green and blue output color signals Rend, Gend and Bend, respectively.

4. The knee circuit as claimed in claim 1 wherein the proportional value generating means generates the proportional value Kk by dividing the virtual correction value (Yk) by the luminance signal Y(i.e. Kk=Yk/Y), and when the virtual luminance signal Y is less than the Knee point NP the virtual correction value generating means generates a virtual correction value Yk which is equal to the virtual luminance signal Y.

5. A knee circuit comprising:

a virtual luminance signal generating means for generating a virtual luminance signal Y on the basis of at least one or two signals selected from a group of input signals including a red color signal Rin, a green color signal Gin and a blue color signal Bin;

a virtual correction value generating means for generating a virtual correction value Yk by performing a knee correction with respect to the virtual luminance signal Y when a level of the virtual luminance signal Y is equal to or greater than a knee point NP at which the knee correction is to be started;

a proportional value generating means for generating a proportional value Kk indicating a ratio of the virtual correction value Yk to the virtual luminance signal Y;

a corrected color signal generating means for generating corrected color signals Rout, Gout and Bout by multiplying each of the input color signals Rin, Gin and Bin by the proportional value Kk when the level of the virtual luminance signal Y is equal to or greater than the knee point NP, and a high luminance suppressing circuit, said high luminance suppressing circuit comprising:

a coefficient generating means for generating a first coefficient $K_1$ defined as $$(Gdet-Gin)/(Gdet-Gth),$$

a second coefficient $K_2$ defined as $$(Rmax-Yk)/(Rout-Yk),$$

and a third coefficient $K_3$ defined as $$(Bmax-Yk)/(Bout-Yk),$$

on the basis of a saturation detection level Gdet specifying a level of the corrected color signal Gout at which color cannot be reproduced, a virtual detection level Gth which is set to a level that is less than the saturation detection level Gdet and more than the knee point NP, a red color maximum output level Rmax specifying a maximum level of red color at which output of the red color is allowable, and a blue color maximum output level Bmax specifying a maximum level of blue color at which output of the blue color is allowable; and a correction color signal generating means for generating an output red color signal Rend defined as $$Yk+(Rout-Yk) \cdot K_o,$$

an output green color signal Gend defined as $$Yk+(Gout-Yk) \cdot K_o,$$

and an output blue color signal Bend defined as $$Yk+(Bout-Yk) \cdot K_o$$

where $K_o \leq 1$ and $K_o$ is a minimum coefficient selected from the respective coefficients $K_1$, $K_2$ and $K_3$, when the level of the green color signal Gin is equal to or more than the virtual detection level Gth, when the level of the corrected color signal Rout is equal to or more than the red color maximum output level Rmax, or when the level of the corrected color signal Bout is equal to or more than the blue color maximum output level Bmax.

6. A method of performing knee correction of color signals, comprising the steps of:

generating a virtual luminance signal Y on the basis of one or at least two signals selected from a group of input signals including a red color signal Rin, a green color signal Gin and a blue color signal Bin;

generating a virtual correction value Yk by performing knee correction with respect to the virtual luminance signal Y when a level of the virtual luminance signal Y is equal to or greater than a knee point NP at which the knee correction is to be started;

generating a proportional value Kk indicating a ratio of the virtual correction value Yk to the virtual luminance signal Y;

generating corrected color signals Rout, Gout and Bout by multiplying each of the color signals Rin, Gin and Bin by the proportional value Kk when the level of the virtual luminance signal Y is equal to or greater than the knee point NP, and correcting said corrected color signals Rout, Gout and Bout when at least one of said input color signals exceeds its saturation detection threshold or when at least one of said corrected color signals exceeds a respective maximum output level, thereby to obtain output color signals Rend, Gend and Bend, respectively.

7. The method as claimed in claim 6 wherein, in said correcting step, the one input color signal is the green signal Gin and said one corrected color signal is the red signal Rout, and said corrected color signals Rout, Gout and Bout are corrected if the corrected blue output signal Bout exceeds its maximum output level Bmax.

8. A knee correction circuit for a video camera, said knee correction circuit comprising:

input means for receiving input color signals including a red color signal (Rin), a green color signal (Gin) and a blue color signal (Bin), means coupled to said input means for generating at its output a virtual luminance signal (Y) based on one or at least two selected signals from said input color signals, a virtual correction value generating means coupled to the output of said means for generating a virtual luminance signal so as to generate a virtual correction value Yk by performing a knee correction with respect to the virtual luminance signal Y when a level of the virtual luminance signal Y is equal to or greater than a knee point NP indicating the start of a knee correction, means responsive to the virtual luminance signal (Y) and the virtual correction value (Yk) for generating a proportional value (Kk) determined by a ratio of the virtual correction value (Yk) to the virtual luminance signal (Y), means responsive to said input color signals, said virtual luminance signal (Y) and said proportional value (Kk) for generating corrected color signals Rout, Gout and Bout by multiplying each of the input color signals Rin, Gin and Bin by the proportional value (Kk) when the level of the virtual luminance signal (Y) is equal to or greater than the knee point (NP), and means for adapting said corrected color signals, Rout, Gout and Bout when at least one of said input color signals exceeds its saturation detection threshold or when at least one of said corrected color signals exceeds a respective maximum output level, thereby to obtain output color signals Rend, Gend and Bend, respectively.

9. A knee correction circuit comprising:

input means for receiving input color signals including a red color signal (Rin), a green color signal (Gin) and a blue color signal (Bin), means coupled to said input means for generating at its output a virtual luminance signal (Y) based on at least one or two selected signals from said input color signals, a virtual correction value generating means coupled to the output of said means for generating a virtual luminance signal so as to generate a virtual correction value Yk by performing a knee correction with respect to the virtual luminance signal Y when a level of the virtual luminance signal Y is equal to or greater than a knee point NP indicating the start of a knee correction, means responsive to the virtual luminance signal (Y) and the virtual correction value (Yk) for generating a proportional value (Kk) determined by a ratio of the virtual correction value (Yk) to the virtual luminance signal (Y), means responsive to said input color signals, said virtual luminance signal (Y) and said proportional value (Kk) for generating corrected color signals Rout, Gout and Bout by multiplying each of the input color signals Rin, Gin and Bin by the proportional value (Kk) when the level of the virtual luminance signal (Y) is equal to or greater than the knee point (NP), and a luminance color suppressing circuit comprising:

a coefficient generator for deriving a first coefficient $K_1$ determined on the basis of at least a saturation detection level Gdet, a second coefficient $K_2$ determined on the basis of at least a red color maximum output level Rmax defining a maximum allowable level of red color, and a third coefficient $K_3$ determined on the basis of at least a blue color maximum output level Bmax defining a maximum allowable level of blue color, and an output color signal generator coupled to said coefficient generator for deriving output red, blue and green corrected color signals each determined on the basis of at least a coefficient $K_0$, where $K_0$ is the minimum coefficient of the coefficients $K_1$, $K_2$ and $K_3$ and $K_0 \leq 1$.

10. The knee correction circuit as claimed in claim 9 wherein the coefficient generator is responsive to said corrected color signals Rout, Gout and Bout, to said virtual correction value (Yk) and to said input green color signal Gin to derive said first, second and third coefficients $K_1$, $K_2$ and $K_3$, respectively.

11. The knee correction circuit as claimed in claim 10 wherein the output color signal generator is responsive to the first, second and third coefficients, $K_1$, $K_2$ and $K_3$, respectively, to said corrected color signals Rout, Gout, Bout, to said input green color signal Gin and to said virtual correction value (Yk) to derive said output red, blue and green corrected color signals.

12. The knee correction circuit as claimed in claim 9 wherein the output color signal generator derives said output corrected color signals if Gin≧Gth or Rout≧Rmax or Bout≧Bmax, where Gth is a virtual detection level that satisfies NP≦Gth≦Gdet.

13. A knee circuit comprising:

a virtual luminance signal generating means for generating a virtual luminance signal Y on the basis of two signals selected from a group of three input signals including a red color signal Rin, a green color signal Gin and a blue color signal Bin such that Y is a function of at least $X_1$ Gin+$X_2$ Rin, where $X_1$ and $X_2$ are coefficients and $X_1 \geq X_2$;

a virtual correction value generating means for generating a virtual correction value Yk by performing a knee correction with respect to the virtual luminance signal Y when a level of the virtual luminance signal Y is equal to or greater than a knee point NP at which the knee correction is to be started;

a proportional value generating means for generating a proportional value Kk indicating a ratio of the virtual correction value Yk to the virtual luminance signal Y; and a corrected color signal generating means for generating corrected color signals Rout, Gout and Bout by multiplying each of the input color signals Rin, Gin and Bin by the proportional value Kk when the level of the virtual luminance signal Y is equal to or greater than the knee point NP.

14. The knee circuit as claimed in claim 13 wherein $X_1=X_2=0.5$.

15. A knee circuit comprising:

a virtual luminance signal generating means for generating a virtual luminance signal Y on the basis of three input signals including a red color signal Rin, a green color signal Gin and a blue color signal Bin and defined as $0.6 \cdot Gin+0.3 \cdot Rin+0.1 \cdot Bin;$ a virtual correction value generating means for generating a virtual correction value Yk by performing a knee correction with respect to the virtual luminance signal Y when a level of the virtual luminance signal Y is equal to or greater than a knee point NP at which the knee correction is to be started;

a proportional value generating means for generating a proportional value Kk indicating a ratio of the virtual correction value Yk to the virtual luminance signal Y; and a corrected color signal generating means for generating corrected color signals Rout, Gout and Bout by multiplying each of the input color signals Rin, Gin and Bin by the proportional value Kk when the level of the virtual luminance signal Y is equal to or greater than the knee point NP.

16. A knee circuit comprising:

a virtual luminance signal generating means for generating a virtual luminance signal Y on the basis of three input signals including a red color signal Rin, a green color signal Gin and a blue color signal Bin and defined as $0.625 \cdot Gin+0.25 \cdot Rin+0.125 \cdot Bin;$ a virtual correction value generating means for generating a virtual correction value Yk by performing a knee correction with respect to the virtual luminance signal Y when a level of the virtual luminance signal Y is equal to or greater than a knee point NP at which the knee correction is to be started;

a proportional value generating means for generating a proportional value Kk indicating a ratio of the virtual correction value Yk to the virtual luminance signal Y; and a corrected color signal generating means for generating corrected color signals Rout, Gout and Bout by multiplying each of the input color signals Rin, Gin and Bin by the proportional value Kk when the level of the virtual luminance signal Y is equal to or greater than the knee point NP.

17. A knee circuit comprising:

a virtual luminance signal generating means for generating a virtual luminance signal Y on the basis of a color signal having a maximum level selected from a group of input signals including a red color signal Rin, a green color signal Gin and a blue color signal Bin;

a virtual correction value generating means for generating a virtual correction value Yk by performing a knee correction with respect to the virtual luminance signal Y when a level of the virtual luminance signal Y is equal to or greater than a knee point NP at which the knee correction is to be started;

a proportional value generating means for generating a proportional value Kk indicating a ratio of the virtual correction value Yk to the virtual luminance signal Y; and a corrected color signal generating means for generating corrected color signals Rout, Gout and Bout by multiplying each of the input color signals Rin, Gin and Bin by the proportional value Kk when the level of the virtual luminance signal Y is equal to or greater than the knee point NP.

* * * * *